United States Patent
Zhodzishsky et al.

(10) Patent No.: US 8,618,981 B2
(45) Date of Patent: Dec. 31, 2013

(54) METHOD FOR BUILDING A VIBRATION-RESISTANT NAVIGATIONAL SATELLITE SIGNALS RECEIVER AND A DEVICE FOR RECEIVING AND PROCESSING NAVIGATION SIGNALS

(75) Inventors: Mark I. Zhodzishsky, Moscow (RU); Andrey V. Veitsel, Moscow (RU); Vladimir V. Beloglazov, Moscow (RU); Victor A. Veitsel, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 80 days.

(21) Appl. No.: 12/737,135

(22) PCT Filed: Dec. 8, 2009

(86) PCT No.: PCT/RU2009/000677
§ 371 (c)(1),
(2), (4) Date: Dec. 11, 2010

(87) PCT Pub. No.: WO2010/074605
PCT Pub. Date: Jul. 1, 2010

(65) Prior Publication Data
US 2011/0260916 A1    Oct. 27, 2011

(30) Foreign Application Priority Data
Dec. 26, 2008   (RU) .............................. 2008151749

(51) Int. Cl.
*G01S 19/37* (2010.01)
(52) U.S. Cl.
CPC ...................................... *G01S 19/37* (2013.01)
USPC ................. 342/357.77; 342/357.75; 375/150; 375/327; 375/343
(58) Field of Classification Search
CPC ...................................................... G01S 19/37
USPC ........... 342/357.68, 357.77, 357.75; 375/150, 375/327, 343
See application file for complete search history.

(56) References Cited

U.S. PATENT DOCUMENTS

| | | | |
|---|---|---|---|
| 6,313,789 B1 * | 11/2001 | Zhodzishsky et al. | ... 342/357.68 |
| 7,222,035 B1 | 5/2007 | Zhodzishsky et al. | |
| 7,573,337 B2 * | 8/2009 | Wang et al. | ................... 331/1 A |
| 2007/0052583 A1 | 3/2007 | Zhodzishsky et al. | |

FOREIGN PATENT DOCUMENTS

| EP | 1 512 985 | 3/2005 |
|---|---|---|
| RU | 47604 | 8/2005 |

OTHER PUBLICATIONS

PCT International Search Report corresponding to PCT Patent Application PCT/RU2009/000677 filed Dec. 8, 2009 (1 page).

\* cited by examiner

*Primary Examiner* — Gregory C Issing
*Assistant Examiner* — Nga X Nguyen
(74) *Attorney, Agent, or Firm* — Wolff & Samson, PC

(57) ABSTRACT

The effects of shock and vibration on a navigation receiver processing satellite signals received from global navigation satellites are reduced by controlling the frequency and the phase of the individual numerically controlled oscillator in each individual satellite channel. The frequency is controlled by an individual frequency control signal based on individual correlation signals generated in an individual satellite channel. The phase is controlled by a common phase control signal or a combination of a common phase control signal and an individual phase control signal. The common phase control signal is based on all the correlation signals generated in all the satellite channels processed by a separate common broadband quartz loop (SCBQL). An individual phase control signal is based on the individual correlation signals generated in an individual satellite channel.

12 Claims, 2 Drawing Sheets

METHOD FOR BUILDING A VIBRATION-RESISTANT NAVIGATIONAL SATELLITE SIGNALS RECEIVER AND A DEVICE FOR RECEIVING AND PROCESSING NAVIGATION SIGNALS

CROSS-REFERENCES TO RELATED APPLICATIONS

This is a U.S. national phase application under 35 U.S.C. §371 of International Patent Application No. PCT/RU2009/000677, filed Dec. 8, 2009, and published as WO 2010/074605 on Jul. 1, 2010, which claims the benefit of Russian Application No. 2008151749, filed Dec. 26, 2008, both of which are incorporated by reference herein.

TECHNICAL FIELD OF THE INVENTION

The invention relates to methods and devices for processing signals in satellite navigation systems.

The reception devices of users of satellite navigation systems receive radio signals from a plurality of satellites and process said signals for the purpose of determining the coordinates of said users. The use of code and phase measurements makes it possible to determine the coordinates of a movable user, a "rover".

During operation, an apparatus installed on a rover can be subjected to strong dynamic disturbances as a result of shaking during movement, jolts during the activities of working assemblies and vibrations from the operation of the engine. Dynamic disturbances have an effect on the quartz of a reference oscillator, thereby causing a drift in the frequency of said oscillator, which is often a cause of a failure of receiver tracking systems.

BACKGROUND OF THE INVENTION

The satellite navigation systems GPS (USA), GLONASS (Russia), GALILEO (Europe) etc. are intended for determining the location of users provided with special navigation receivers. The navigation receiver receives and processes the radio signals emitted by satellites located in its direct visual range.

The satellite signals are modulated using a pseudorandom binary code, which is used for measuring the delay in relation to a local reference oscillation. These measurements make it possible to determine pseudoranges which differ from the actual ranges from the satellites as a result of a discrepancy between the time scales on board the satellite and at the user and as a result of measurement errors. If the quantity of satellites is sufficient, by processing the measured pseudoranges it is possible to determine the coordinates of the user and to match the time scales.

The necessity to solve problems which require a high degree of accuracy as well as the attempt to increase the stability and reliability of the measurements have lead to the development of the differential navigation (DN) mode. In the DN mode, the coordinates of the user are determined in relation to a base station (Base), whose coordinates are known with a high degree of accuracy. During the measurements, the base station is usually immovable, while the user can be either immovable or moving. At the Base there is a navigation receiver, which receives and processes the satellite signals. The results of these measurements are transmitted to the user, which also has a navigation receiver.

Using the joint processing of the measurements of the Base and the rover, the user is provided with the possibility of accurately determining its relative coordinates as a result of compensation for the significant proportion of strongly correlated errors. Depending on the problems to be solved in the DN, it is possible to use various modes. In the post-processing mode, the joint processing of the measurements of the base and the rover is performed on the basis of an entry after all of the measurements are complete. In the real-time processing mode, the coordinates of the rover are determined in real time in terms of the arrival of information from the base over the communications line.

The increase in the accuracy of the DN can be achieved if the pseudorange measurements on the basis of codes are supplemented by measurements of the phase of the carrier. By measuring the phase of the carrier of the signal received from the satellite in the base receiver and comparing said phase with the phase of the carrier from the same satellite, which phase of the carrier is measured in the receiver of the rover, it is possible to achieve accuracy in the relative coordinates to several percentage points from the length of the wave of the carrier oscillation.

Implementing the advantages which make it possible to take the measurements on the basis of the phase of the carrier requires that any ambiguity in the phase measurements be resolved. Since the difference in the ranges from the base to the rover are usually significantly greater than the length of the wave, the difference in the phases of the carriers received by the receivers of the base and of the rover can significantly exceed 360 degrees. As a result of this, the measured difference in the phases will differ from the actual difference in the total phases by an integer of cycles (1 cycle corresponds to 360 degrees). This integer of cycles proves to be unknown and needs to be determined on the basis of the results of the measurements together with other unknown values, namely the coordinates of the rover and the discrepancy between the time scales.

Each satellite whose radiation is received by the receiver uses one satellite channel. Dual-frequency receivers receive radiation from satellites in the ranges L1 and L2 and respectively measure the phases at two frequencies f1 and f2, which makes it possible to make corrections to the ionospheric delay and makes it easier to resolve any ambiguity.

In the navigation receiver, signals from different satellites are divided between channels and are processed with the aim of extracting navigation information which is contained in the value of the relative time delays between incoming signals. Radio signals entering the input of the navigation receiver from an antenna are fed to a radio path which is common to signals from different satellites and comprises input and filtering units and frequency converters. Once the satellite signals have passed through the common radio path, said signals are processed separately in digital satellite channels, with there being one channel for each satellite.

The basis of the channel of each satellite comprises two tracking systems, which track the changes in the parameters of the incoming signal. The first tracking system, the "delay-locked loop" (DLL), tracks the changes in the delay of the modulating pseudorandom code in the incoming signal. The second tracking system, the "phase-locked loop" (PLL), tracks the changes in the phase of the carrier in the incoming signal.

In order to form the tracking systems, the signal is converted into digital form and is processed, both using hardware and using software, in a microprocessor, which is part of the receiver. The processing of the signal received includes storing the result of successive multiplication of this signal by the reference carrier and the reference code which are generated in the receiver. The reference carrier corresponds to the carrier of the received signal for this satellite, and the reference code is the respective pseudorandom code (PR code) with which the signal of that satellite was modulated.

The devices performing this multiplication and storing are called "correlators", and the corresponding process is called the correlation of two signals. The output value of the correlator is the intercorrelation function of the input and reference signals. Each satellite channel in the receiver comprises three parallel correlators.

In the first correlator, the in-phase correlation signal I is calculated. Such a signal is obtained if the first reference carrier, which is in phase with the carrier of the input signal, is used in the correlator. The reference code is a copy of the PR code which modulates the input signal. As a result of the correlation of said signals, the in-phase signal I is formed. Initially, or as a result of errors, the phase of the reference carrier can differ from the phase of the carrier of the input signal, and the delay of the reference code can differ from the delay of the modulating code.

If the phase shift of the first reference carrier is designated by the letter $\phi$ and the time shift of the reference code in relation to the input (modulating) code is designated by $\tau$, the signal I shall be determined by the following relationship:

$$I = kUs\mu R_o(\tau)\cos\phi + I_{in} \tag{E1}$$

where:

$R_o(\tau)$ is the standardized intercorrelation function of the input PR code (having passed through the filter in the common radio path of the receiver) and of the reference code, which is a locally generated copy of the PR code which modulates the satellite signal;

$\cos\phi$ is the result of the correlation between the carrier of the input signal and the in-phase reference carrier in the event of the presence of a phase shift;

Us is the amplitude of the input signal;

$\mu = \pm 1$ is the information symbol modulating the input signal;

k is the coefficient of proportionality; and $I_{in}$ is the interference at the output of the correlator I which is generated as a result of the action of additive interference at the input of the receiver.

The signal I is used for extracting the information symbols and, in the other paths, is used as an auxiliary signal for standardization. In the tracking mode, the values $\phi$ and $\tau$ are small and $R_o(\tau)\cos\phi$ approaches unity. Furthermore, the in-phase correlation signal I reproduces the sequence of information symbols $\mu = \pm 1$ transmitting messages from on board the navigation satellite to the receiver of the user. The messages contain information on the coordinates of the satellite, the expected characteristics of the conditions for propagation and other data which are used in the coordinate determinations.

The second correlator of the satellite channel calculates the quadrature correlation signal Q. This signal is produced if the second (quadrature) reference carrier whose phase is shifted through $\pi/2$ in relation to the first reference carrier, is used and the reference code is identical to the code in the first path. The correlation of said signals (in "correlator Q") forms the quadrature correlation signal Q, which is determined on the basis of the following relationship:

$$Q = kUs\mu R_o(\tau)\sin\phi + Q_{in} \tag{E2}$$

where:

$Q_{in}$ is the interference at the output of the correlator Q which is generated by the additive interference at the input of the receiver, and $\sin\phi$ is the result of the correlation between the carrier of the input signal and the quadrature reference carrier.

The signal Q is used for generating an error signal in the phase-locked loop (PLL).

The third correlator of the satellite channel calculates the coded correlation signal dI used for generating an error signal with the aim of controlling the Delay-Locked Loop (DLL) for the modulating code. The first reference carrier (which is in phase with the carrier of the input signal) and the reference code, which consists of short strobe pulses corresponding to the times at which the mathematical sign of the elements of the input PR code changes, are used to produce this signal.

The signal dI is determined on the basis of the following relationship:

$$dI = kUs\mu\Delta R_o(\tau)\cos\phi + dI_{in} \tag{E3}$$

where:

$\Delta R_o(\tau)$ is the intercorrelation function of the input PR code (once it has passed through the radio path of the receiver) and of the reference code in the form of a sequence of short strobe pulses; and $dI_{in}$ is the interference at the output of the "correlator dI" which is generated by the additive interference at the input of the receiver.

During operation of the receiver, the values used in the relationships change and, correspondingly, the correlation signals determined on the basis thereof also change. After the calculation, the correlation signals are stored in adders with a dump, in which adders the magnitudes of the correlation signals are stored (once the mathematical signs of the information symbols have been removed):

$$I^* = \Sigma I$$

$$Q^* = \Sigma Q$$

$$dI^* = \Sigma dI$$

The stored signals I*, Q*, dI* generated in the paths of each channel are used for the joint operation of the tracking systems, namely the phase-locked loop for tracking the carrier frequency and the delay-locked loop for the PR code.

The tracking error signal is determined in a discriminator on the basis of the following relationship:

$$Zd = \arctan(Q^*/I^*). \tag{E4}$$

The tracking error signal Zd is proportional to the error $\phi$ within the range of $\pm\pi/2$, and then is repeated periodically. The dependence of Zd on $\phi$ forms the discriminator characteristic of the PLL. The error signal is sent to a loop filter, which issues a control signal and closes the circuit of the PLL, whilst controlling the phase shift of the numerically controlled oscillator of the channel (NCO). The time shifts in the reference codes in the 1st and 2nd paths are firmly linked in time to the DLL-regulated shift in the reference code of the third path.

The tracking systems PLL and DLL are closed circuits with the task of reducing the tracking errors $\tau$ and $\phi$ to zero. For this purpose, the error signals are converted into control signals, which change the phase and delay of the oscillators of the reference signals. In real conditions, as a result of the external influences on the tracking systems, the values of the tracking errors are different than zero, but under normal conditions in the tracking mode, the errors are small and fluctuate about the point of stable equilibrium at which the error signal is equal to zero. A system of searching by delay and frequency is used for the tracking systems of receiver channels entering the tracking mode.

In previous technical solutions, the tracking of signals from different navigation satellites has been performed in different satellite receiver channels by independent individual tracking systems: PLL and DLL, and the bands thereof needed to be selected, on the basis of contradictory requirements, taking into account noise errors and dynamic errors. However, the quickest changes in the delay of signals taking effect on these tracking systems are common to all the satellite channels. Movements of the antenna of the user and an offset of the time scale of the receiver of the rover can be added to the common delays.

The U.S. Pat. No. 6,313,789 proposes a method for organizing tracking systems in a navigation receiver, in which signals from all of the satellites being observed are processed jointly in order to track the common changes in the delays. As a result, a series of advantages was obtained owing to the use of the total power of all of the satellites. In addition, the power of the signal from each satellite was used separately for tracking comparatively slow disturbances in the individual loops of the PLL, said disturbances acting solely on the signal from said satellite, independently of the others. The individual loops could be made comparatively narrowband in order to suppress the effect of noise.

The proposed method was implemented by means of creating a vector common loop in the receiver, which consisted of three geometrical common circuits (for three geometrical coordinates to be measured) and a fourth (quartz) common circuit for tracking the fluctuations in the phase of the reference oscillator. All of the circuits in the common loop were identical and the vector common loop was produced so as to be uniform. Apart from the vector common loop in the receiver, individual PLL loops also remained for tracking the phase of the carrier in each channel.

Combining the channels in a uniform vector loop was performed at the output of the PLL discriminators. The output signals of the discriminators from different channels were added and processed in accordance with the method of least squares in order to produce four combined error signals relating to four measured coordinates, and the resultant magnitudes of the error signals were filtered.

For the geometrical circuits, the signals were projected in the directions of vectors of the range from satellites and, when added to the signal of the quartz circuit and the error signals of individual loops, controlled the frequency of the PLL reference oscillators of each channel. In addition, the U.S. Pat. No. 6,313,789 has proposed, for the case of an immovable rover, generating a common phase signal, filtering said signal and using the filtered signal as a correcting phase signal.

In the majority of cases, the receiver of the rover operates in complex conditions with different external influences and interference which are the reason for the measurement errors. It is customary to differentiate between usual (normal) errors which define the accuracy of the measurements and abnormal errors whose values are so great that the corresponding abnormal measurement can represent a substantial hindrance when performing the task addressed by the user. Abnormal errors are occasionally a consequence of inadvertently large inherent noise emissions, but are more often associated with external influences on the receiver.

A particular type of abnormal phase error is a sudden change in phase of the PLL carrier. In the event of an isolated sudden change, the PLL transfers to a new stable point, after which the tracking is continued. As a result, an abnormal error which is a multiple of the integer of half-cycles remains after the sudden change in the measurements of the full phase. In the event of a long duration of the sudden change or a series of sudden changes, an interruption in the PLL tracking is detected and the search system begins to function.

The occurrence of strong re-reflected signals or the exposure to strong radio interference can lead to abnormal errors.

In receivers intended for installation on movable objects, the external dynamic influences play a particular role and the abnormal errors arising in the process are often the cause of interruptions in the tracking. The movement of the rover is accompanied by mechanical disturbances. The frequency of the input signals is offset proportionally to the speed, the operation of the engine causes vibrations of differing frequency, and vibrations, jolts or impacts during movement of the rover cause pulsed accelerations which have an effect on the reception antenna and on the quartz of the local reference oscillator, thereby causing a drift in the intermediate carrier frequency and the measured phase. As a result, PLL errors occur which can lead to an interruption in the tracking.

In order to reduce the probability of interruptions in the tracking, special measures are taken to suppress dynamic disturbances. The method proposed in the U.S. Pat. No. 6,313,789 has provided the solution to the problem of increasing shock resistance by widening the bandwidth of the tracking system. It has been proposed that the structure and parameters of the four circuits of the vector common loop be made identical and be selected from conditions representing a compromise between the value of the fluctuating (noise) errors and the dynamic errors arising during movement.

Since all of the circuits were identical, the vector common loop proved to be uniform. However, under conditions where the receiver was exposed to particularly strong vibrations and jolts (for example for receivers used for control purposes in construction machinery), it often happened that the uniform common loop did not have a sufficient effect.

BRIEF SUMMARY OF THE INVENTION

Dynamic disturbances have an effect on the quartz of a reference oscillator, thereby causing a drift in the frequency of said oscillator, which is often a cause of a failure of receiver tracking systems. These phenomena can be lessened to a significant degree if the receiver is also provided with a special feedback loop which reduces the tracking errors in the event of oscillations in the frequency of the reference oscillator.

The present invention proposes a method for constructing systems for tracking phases of signals in channels of separate satellites, which have been supplemented by a separate common broadband quartz loop (SCBQL). The invention proposes using the method of frequency phase control in each satellite channel for PLL, wherein the control of the frequency of the numerically controlled oscillator of the channel (NCO) is supplemented by the control of the phase thereof. The individual PLL with frequency-phase control is supplemented by control from a common broadband quartz loop, which is formed on the basis of signals from all of the satellites being observed and has a comparatively higher clock frequency. As a result, a multi-circuit system is produced in the receiver, said system tracking the changes in the phase of the carrier, which maintains the tracking mode in the event of strong dynamic disturbances.

DETAILED DESCRIPTION

Figure 1:
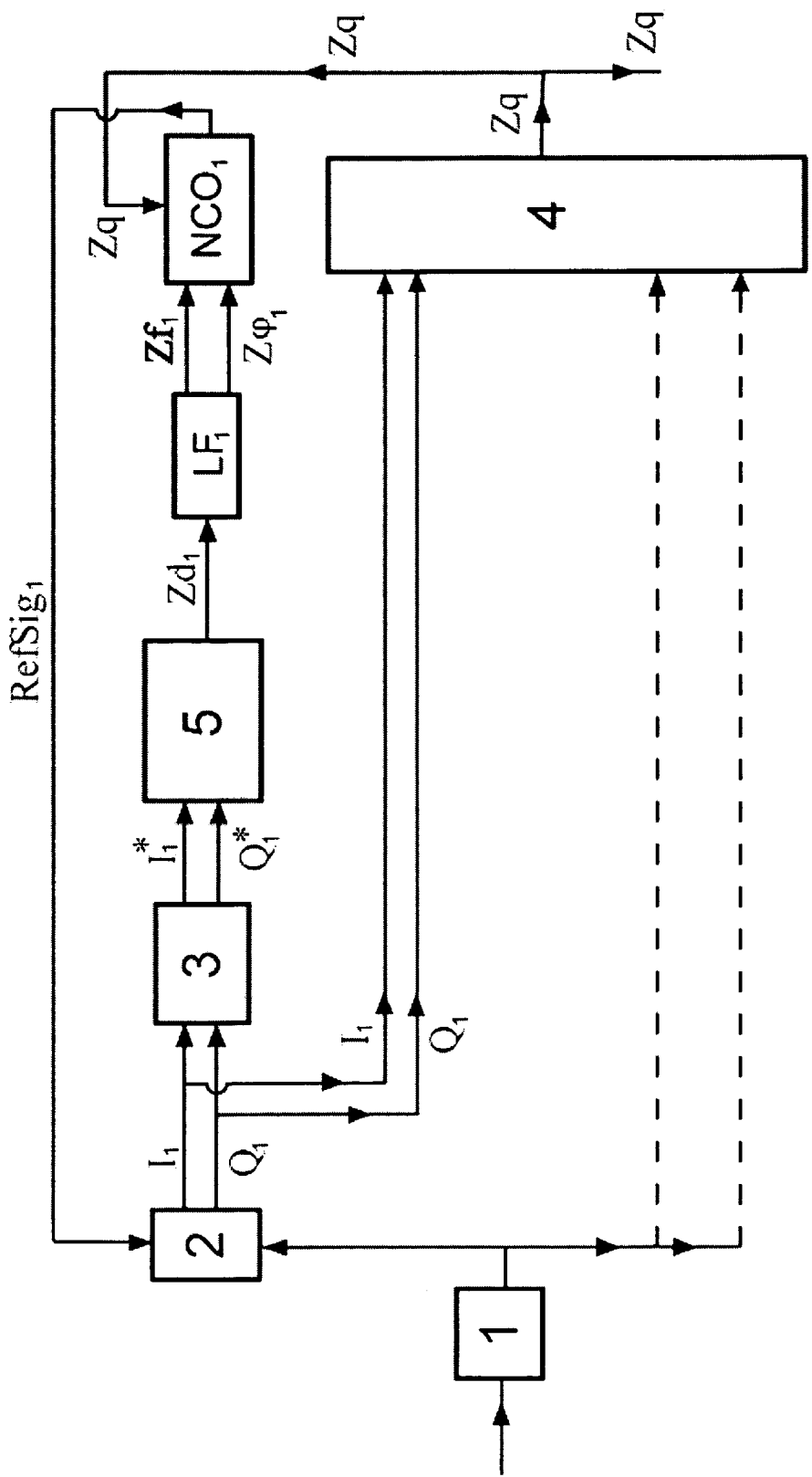
FIG. 1 shows a tracking system with a broadband quartz loop.

FIG. 1 shows a tracking system with a broadband quartz loop. The satellite signals, having been converted in a common radio path (1), are digitized and fed to the inputs of correlators (2) of the satellite channels. Each correlator generates its pair of said correlation signals I and Q (in accordance with the relationships E1 and E2), which have a high clock frequency (for example 1 kHz).

In order to control the channel PLLs, the clock frequency is reduced (for example to 200 Hz) in a unit known as "an accumulator with a dump" (3). The correlation signals I and Q are fed, parallel to one another, to a discriminator of a separate common broadband quartz loop (4).

The circuits of the channel PLLs are constructed on the basis of a circuit with frequency control or frequency-phase control of a numerically controlled oscillator (NCO) of each channel. A channel discriminator (5), which produces (in accordance with relationship E4) a tracking error signal $Zd_{PLL}$ in digital form, is introduced into the PLL circuit. The following component in the circuit of the channel, the loop filter LF, determines the order of astaticism of the PLL (a loop filter with two integrators which gives 3rd order astaticism is preferably used). A digital control signal consisting of two components, namely component $Z_f$ for controlling the NCO on the basis of frequency and component $Z_\varphi$ for controlling the phase of the NCO, is taken from the loop filter.

Figure 2:
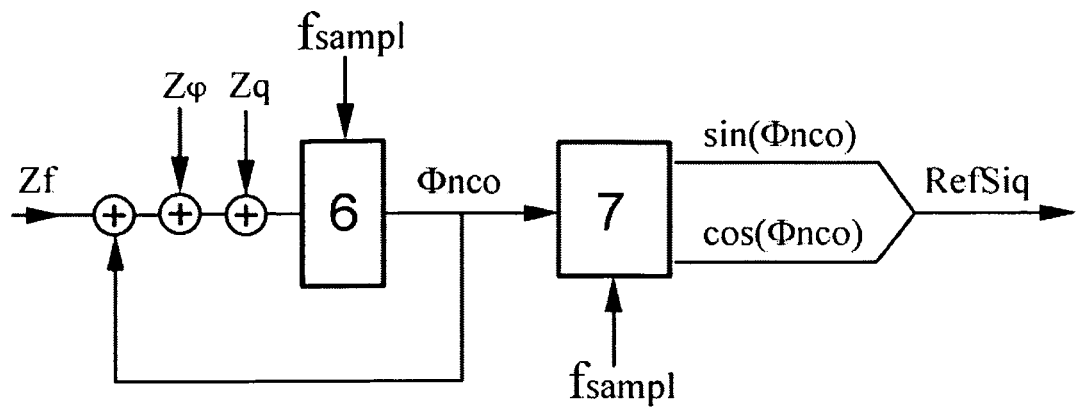
FIG. 2 shows a circuit of the numerically controlled oscillator of a satellite channel of an NCO which is intended for separate control for the i-th channel.

FIG. 2 shows a circuit of the numerically controlled oscillator of a satellite channel of an NCO which is intended for separate control for the i-th channel. The accumulator unit operates at a high clock frequency $f_{sampl}$ and combines the following control signals:

- Zf, which represents a frequency code, which is restored with the NCO control clock and maintains its value in the interval between the control clock signals;
- $Z_\varphi$, which represents a phase code, which is fed to the accumulator with the same clock and is set to zero once it has been stored in an adder; and
- Zq, which is fed from the discriminator of the separate common broadband quartz loop (SCBQL) with each clock signal of its operation and is set to zero once it has been stored in the adder.

In the accumulator, all of the signals are added in the register (6), which is surrounded by a positive feedback link in such a way that its output $\Phi_{NCO}$ with a clock period of $T_{sampl}=1/f_{sampl}$ is added to the control signals. As a result, a phase code is generated at the output of the register, in which phase code one component in digital form corresponds to the integral of the frequency code, and two other components are the phases of the channel PLL and the SCBQL, respectively.

The memory volume of the register is limited to a value which corresponds to $2\pi$ and when there is a memory overflow, the remainder, which is the difference between the magnitude of the number with the overflow and $2\pi$, remains in said register. Therefore, the phases are added on the basis of a modulus of $2\pi$, within a cycle.

The result of this adding, $\Phi_{NCO}$, with a frequency $f_{sampl}$, is converted in a phase converter unit (7) so as to form (in digital form) a reference signal consisting of said reference carriers. The reference carriers in the form of two reference signals RefSig are fed to a second input of the correlator whilst closing the circuit of the channel PLL.

Figure 3:
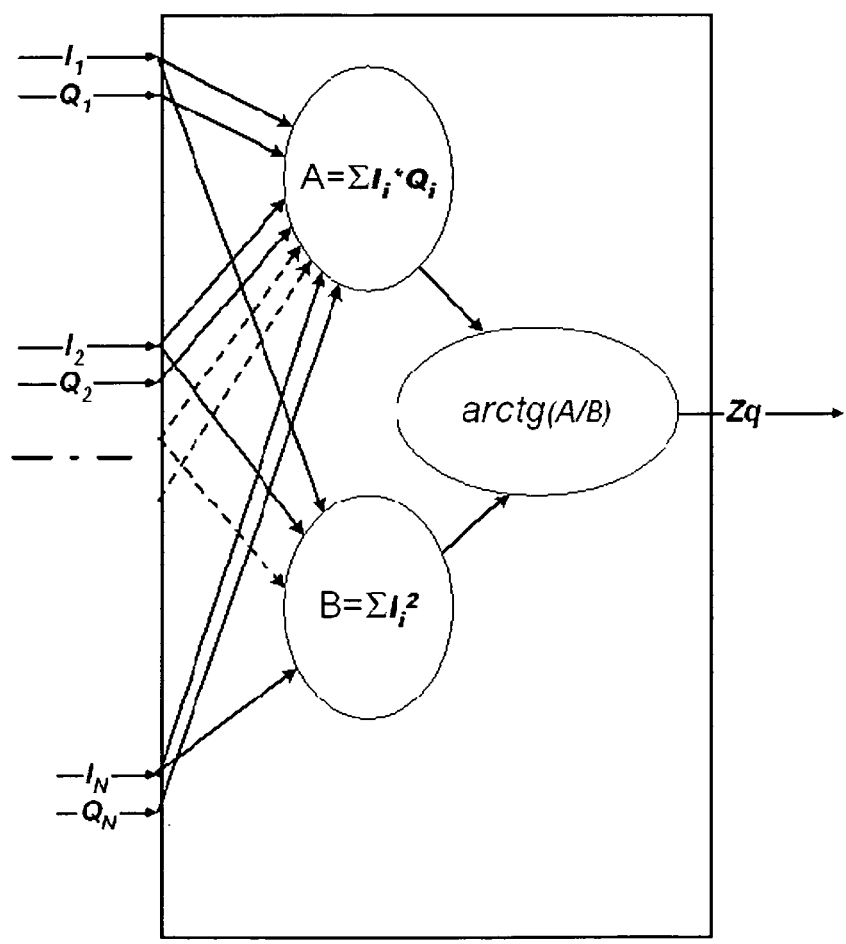
FIG. 3 shows a circuit of the discriminator of the common broadband quartz loop of the receiver.

FIG. 3 shows a circuit of the discriminator of the common broadband quartz loop of the receiver. The correlation signals $I_i$, $Q_i$, which are collected from all of the satellite channels, form two signals in the discriminator of the SCBQL, namely signal A in the form of the sum of the products $I_i*Q_i$:

$$A = \sum_{i=1}^{N} I_i * Q_i, \tag{E5}$$

and signal B in the form of the sum of the squares of the in-phase correlation signals I $$B = \sum_{i=1}^{N} I_i^2, \tag{E6}$$

where N is the number of active satellite channels ($1<=i<=N$).

The output of the discriminator of the separate common broadband quartz loop is formed as:

$$Z_q = \arctan(A/B). \tag{E7}$$

The proposed invention can be implemented in the following way. In the case of a high level and a broad spectrum of dynamic disturbances, in particular during a movement of the rover, the drifts in the frequency of the quartz reference oscillator become very dangerous, wherein a uniform structure of the four circuits of the vector common loop becomes fairly ineffective. The disturbances acting on the quartz lead to phase errors which are common to all of the satellites and do not give errors in the coordinates in the tracking mode. Slight oscillations of the quartz only have an effect on the assessment of the time shift and have a weak effect on the measurement of the coordinates, but considerable oscillations can cause sudden changes or interruptions in the tracking.

The effect of external influences via the antenna and the quartz on the stability of the tracking systems is different, and this brings about the need for different ways of combating said influences. Mechanical disturbances offset the antenna and the phase shifts arising in the process on the carrier of the PLL signal are proportional to the value of these offsets.

If the antenna oscillates at a constant amplitude, the amplitude of the phase shifts is proportional to the amplitude of the antenna oscillations and is not dependent on the frequency thereof. However, in the event of mechanical offsets of the quartz, the phase shifts which arise on the carrier of the PLL signal are proportional to the value of the offset rate. If the quartz performs the oscillations at a constant amplitude, the amplitude of the phase shifts on the carrier is proportional to the amplitude and the frequency of the mechanical oscillations. The phase shifts on the carrier bring about corresponding tracking errors with a value which is proportional to the amplitude of the phase shifts, and, as a result of large tracking errors, sudden changes and interruptions in the tracking are possible.

In the event of high-frequency vibrations, the phase shifts will be more intensive than as a result of antenna oscillations because the degree of danger of the loss of tracking as a result of high-frequency vibrations is primarily determined by the quartz and, in order to compensate for the high-frequency vibrations, the quartz common loop needs to have a correspondingly broad bandwidth. The quantitative link between the reliability of the tracking and the nature of the phase shifts occurring is also dependent on the structure and parameters of the tracking circuit. A monotonous movement of the antenna offsets the carrier frequency proportionally to the movement speed.

In a circuit with 1st order astaticism, the offset of the carrier frequency can go beyond the PLL maintenance band and the tracking fails. Therefore, the invention proposes the use of 2nd or 3rd order astaticism in the circuits of the uniform common loop, if necessary, with which the range for tracking the drift in frequency is virtually unlimited. In the event of an identical movement of the quartz, an offset of the frequency will be proportional to the value of the acceleration and, if the movement is equal, the quartz will not have any effect on the tracking errors. A high order of astaticism is not obligatory in a broadband common loop in order to compensate for oscillations of the quartz.

An acceleration which arises in the event of a dynamic disturbance is a vector and is characterized by a value and a direction, and therefore the acceleration of the antenna has different effects on signals from different satellites which are arriving from different directions, which is taken into consideration when constructing a uniform vector common loop. The signals for a uniform common loop are generated from the outputs of the phase discriminators in the channel of each satellite and are then corrected on the basis of a calculated matrix of directional cosines for each satellite. Such a correction is not required for a broadband quartz loop and it is possible to use a more interference-resistant discriminator, which is not dependent on the geometry of the constellation of the satellites, to generate the signals.

For the abovementioned reasons, the present invention proposes designing the circuit of the broadband quartz loop as a separate operational unit which is common to all of the channels and is independent of the structure and even of the presence of the geometric circuits of the common loops which are tracking the changes in the geometrical coordinates. In this case, the structure and parameters of this Separate Common Broadband Quartz Loop (SCBQL) can be designed taking into consideration only the specific nature of the phase fluctuations associated with the effect of external influences on the quartz. As a result, it has proven to be possible to suppress the effect of comparatively strong and high-frequency vibrations and to produce a navigation receiver which is capable of stable operation when installed without any special shock absorbers.

The separate common broadband quartz loop (SCBQL) is constructed on the following bases. In the SCBQL, loop filters are not used, and discrete control with low inertia is used, said inertia ensuring a bandwidth which is close in value to the clock frequency. The circuit of the SCBQL can have 1st order astaticism, in contrast to the circuits of the individual PLLs, where a higher order of astaticism is used.

The use of the SCBQL necessitates the use of channel NCOs with separate control. The numerically controlled oscillator (NCO) operates at a high natural clock frequency (sample frequency). Signals from the separate common broadband quartz loop perform the phase control of the NCO, wherein the control signals from the SCBQL which arrive periodically at a set clock frequency (this clock frequency is significantly lower than the sample frequency) change, stepwise on each clock signal, the phase of the controlled oscillator (NCO), whereas frequency-phase control is used in the individual PLLs.

Furthermore, two control signals are fed to the NCO from the PLL. The first control signal controls the frequency of the NCO and changes its frequency stepwise on each clock signal, and the second control signal changes the phase of the NCO on each clock signal. Therefore, the NCO in each channel is controlled by a total of three signals, and, in general, each of these signals can have its own clock frequency. As a rule, the clock frequency of the control signals is significantly lower than the sample frequency of the NCO, the latter frequency being in the range of 40-50 MHz. In some embodiments for the individual PLLs it is possible for this to be restricted to only one first control signal, i.e. to use frequency control in the individual PLL and phase control in the SCBQL.

The clock frequency of the SCBQL is significantly higher than the clock frequencies of the individual PLLs.

Depending on the field of use, the SCBQL can be the only common loop in the receiver, which loop uses the total power of all of the satellites being observed. In other aspects of the invention, both a separate SCBQL and a geometrical vector common loop consisting of three circuits are used.

The discriminator of the SCBQL does not use the output values of the discriminators of individual PLLs. The output signal of the discriminator of the SCBQL is formed, as a function of correlation signals I, Q from all of the individual satellite channels. The discriminator of the SCBQL, at a sufficiently high clock frequency, can operate both in the steady-state mode (with an immovable receiver) and in the kinematic mode (receiver on a moving rover). In the discriminator of the SCBQL, the loss of a signal in one or more channels does not result in an overshoot in the control signal which could lead to an interruption in the tracking.

The essential distinguishing feature of the proposed structure of the tracking systems is the use of different clock frequencies for time sampling in different elements in the circuit. The recommended mean values for the frequencies for generating signals are listed in Table 1:

TABLE 1

| Signals | Time sampling frequency |
| --- | --- |
| I, Q | 1000 Hz |
| I*, Q* | 200 Hz |
| Zd | 200 Hz |
| Zf, $Z_\phi$ | 200 Hz |
| $f_{sampl}$ | 40 ... 50 MHz |
| Zq | 700 ... 1000 Hz |

The invention claimed is:

1. A method for processing satellite signals, the method comprising the steps of:
receiving a plurality of satellite signals from a plurality of global navigation satellites;
converting the plurality of satellite signals into a plurality of digital satellite signals by a common radio processor;
for each individual satellite channel in a plurality of satellite channels, wherein each individual satellite channel in the plurality of satellite channels corresponds to an individual satellite in the plurality of global navigation satellites:
generating a first pair of correlation signals for each of the plurality of digital satellite signals, wherein each of the plurality of digital satellite signals is associated with a first clock frequency;
propagating the first pair of correlation signals for each of the plurality of digital satellite signals, in parallel, directly to an accumulator with a dump and directly to a discriminator of a separate common broadband quartz loop;

generating a second pair of correlation signals associated with a second clock frequency, as input for a channel discriminator, based at least in part on the first pair of correlation signals;

generating, by a channel discriminator, a digital tracking error signal based at least in part on the second pair of correlation signals, wherein the digital tracking error signal is inputted to a loop filter;

generating, by the loop filter, an individual frequency control signal and an individual phase control signal based at least in part on the digital tracking error signal;

generating, by a discriminator of a separate common broadband quartz loop, a common phase control signal based at least in part on the first pair of correlation signals; and controlling a frequency of an individual numerically controlled oscillator based at least in part on the individual frequency control signal, the individual phase control signal and the common phase control signal.

2. The method of claim 1, wherein:
the first clock frequency ranges from 700 Hz to 1000 Hz; and
the second clock frequency ranges from 180 Hz to 220 Hz.

3. The method of claim 1, wherein the step of generating a common phase control signal based at least in part on the first pair of correlation signals comprises the step of generating the common phase control signal according to the algorithm:

$$Z_q = \text{arctg}\frac{A}{B},$$

wherein:
$Z_q$ is the common phase control signal, $$A = \sum_{i=1}^{N} I_i * Q_i,$$

$$B = \sum_{i=1}^{N} I_i^2,$$

i is an index of an individual satellite in the plurality of global navigation satellites,
N is the total number of satellites in the plurality of global navigation satellites;
$I_i$ is an in-phase discrete correlation signal for the i-th satellite; and
$Q_i$ is a quadrature-phase discrete correlation signal for the i-th satellite.

4. The method of claim 3, further comprising the steps of:
at a time of each clock signal in a first plurality of clock signals:
storing the value of the common phase control signal at the time of the clock signal; and
resetting to zero the value of the common phase control signal until the time of the next clock signal.

5. The method of claim 1, further comprising the steps of:
for each individual satellite channel in the plurality of satellite channels:
receiving the individual frequency control signal, the individual phase control signal, and the common phase control signal in an individual accumulator operating at a sampling frequency;
generating an individual phase code in the individual accumulator based at least in part on the received individual frequency control signal, the received individual phase control signal, and the received individual phase control signal; and
converting the individual phase code in an individual phase converter operating at the sampling frequency.

6. The method of claim 5, wherein the sampling frequency is selected from the range of 40 MHz to 50 MHz.

7. The method of claim 6, wherein the individual accumulator comprises a register comprising:
an individual register input;
an individual register output; and
an individual memory having a capacity corresponding to $2\pi$ radians.

8. The method of claim 7, wherein the step of receiving the individual frequency control signal, the individual phase control signal, and the common phase control signal comprises the step of receiving the individual frequency control signal, the individual phase control signal, and the common phase control signal at the individual register input, further comprising the steps of:
outputting the individual generated phase code at the individual register output; and
feeding back the individual generated phase code from the individual register output to the individual register input.

9. The method of claim 5, wherein the step of converting the individual phase code in an individual phase converter operating at the sampling frequency comprises the steps of:
receiving the individual generated phase code at an input of the individual phase converter;
generating an individual first reference code in the individual phase converter, wherein the individual first reference code comprises the sine of the individual generated phase code; and
generating an individual second reference code in the individual phase converter, wherein the individual second reference code comprises the cosine of the individual generated phase code.

10. The method of claim 9, wherein the step of generating, at the time of each clock signal in a first plurality of clock signals with a first clock frequency, discrete correlation signals is based at least in part on the individual generated first reference code and the individual generated second reference code.

11. A device for processing a plurality of satellite signals, each individual satellite signal in the plurality of satellite signals received from an individual satellite in a plurality of global navigation satellites, the device comprising:
a common radio processor configured to:
receive a plurality of satellite signals from a plurality of global navigation satellites and convert the plurality of satellite signals into a plurality of digital satellite signals;
a plurality of phase-lock loops, wherein:
each individual phase-lock loop comprises:
a correlator configured to:
generate a first pair of correlation signals for each of the plurality of digital satellite signals, wherein each of the plurality of digital satellite signals is associated with a first clock frequency; and
propagate the first pair of correlation signals for each of the plurality of digital satellite signals, in parallel, directly to an accumulator with a dump and directly to a discriminator of a separate common broadband quartz loop;

the accumulator with a dump configured to:
generate a second pair of correlation signals associated with a second clock frequency, as input for a channel discriminator, based at least in part on the first pair of correlation signals;

the channel discriminator configured to:
generate a digital tracking error signal based at least in part on the second pair of correlation signals, wherein the digital tracking error signal is inputted to a loop filter;

the loop filter configured to:
generate an individual frequency control signal and an individual phase control signal based at least in part on the digital tracking error signal; and a separate common broadband quartz loop configured to:
generate a common phase control signal based at least in part on the first pair of correlation signals, wherein the individual frequency control signal, the individual phase control signal, and the common phase control signal control a frequency of an individual numerically controlled oscillator.

12. The device of claim 11, wherein the separate common broadband quartz loop comprises a discriminator configured to generate the common phase control signal according to the algorithm:

$$Z_q = \operatorname{arctg}\frac{A}{B},$$

wherein:

$Z_q$ is the common phase control signal, $$A = \sum_{i=1}^{N} I_i * Q_i,$$

$$B = \sum_{i=1}^{N} I_i^2,$$

i is an index of an individual satellite in the plurality of global navigation satellites, N is the total number of satellites in the plurality of global navigation satellites;

$I_i$ is an in-phase discrete correlation signal for the i-th satellite; and $Q_i$ is a quadrature-phase discrete correlation signal for the i-th satellite.

\* \* \* \* \*